United States Patent
Hunter (10) Patent No.: US 7,139,095 B1
(45) Date of Patent: Nov. 21, 2006

(54) USER INTERFACE FOR INSTANT AND FULL-FEATURED INDEX PAGE PRINTING FROM A DIRECT-CONNECT PRINTER

(75) Inventor: Wendy F. Hunter, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1137 days.

(21) Appl. No.: 09/672,415

(22) Filed: Sep. 28, 2000

(51) Int. Cl.
*G06K 15/00* (2006.01)
*G06F 3/12* (2006.01)

(52) U.S. Cl. .................. 358/1.18; 358/1.13; 358/1.6

(58) Field of Classification Search ............ 358/1.18, 358/1.19, 447, 448, 452, 453, 504, 520, 537, 358/518, 1.16, 1.13, 1.6, 1.14, 1.15, 1.17, 358/501, 403, 449, 451; 382/162, 167; 348/207.99–376
See application file for complete search history.

(56) References Cited

U.S. PATENT DOCUMENTS

| | | | | |
|---|---|---|---|---|
| 3,649,121 A | | 3/1972 | Cohen ..................... 355/77 |
| 4,232,962 A | | 11/1980 | Sauer ..................... 355/46 |
| 5,636,007 A | | 6/1997 | Yamashita ............... 355/77 |
| 5,717,838 A | * | 2/1998 | LeClair .................... 358/1.9 |
| 5,917,488 A | * | 6/1999 | Anderson et al. ........ 345/838 |
| 5,940,169 A | | 8/1999 | Masutani ................. 355/40 |
| 6,301,586 B1 | * | 10/2001 | Yang et al. ............ 707/104.1 |
| 6,335,746 B1 | * | 1/2002 | Enokida et al. ......... 345/839 |
| 6,392,758 B1 | * | 5/2002 | Hines ..................... 358/1.9 |
| 6,426,801 B1 | * | 7/2002 | Reed ..................... 358/1.16 |
| 6,477,266 B1 | * | 11/2002 | Asar ...................... 382/147 |
| 6,493,108 B1 | * | 12/2002 | Hirai ..................... 358/1.18 |
| 6,582,475 B1 | * | 6/2003 | Graham et al. ........ 715/513 |
| 6,654,509 B1 | * | 11/2003 | Nishikawa et al. ..... 382/298 |
| 2001/0033303 A1 | * | 10/2001 | Anderson ................ 345/854 |

* cited by examiner

Primary Examiner—Douglas Q. Tran (57) ABSTRACT

A user interface for a printer is disclosed for printing image files. The user interface includes a display for displaying information, including messages to a user, an input device for enabling the user to respond to the displayed messages, an interface to a detachable memory device including at least one image file, and a processor coupled to the input device, display, and to the interface. The processor is responsive to a user input to print a thumbnail of the image file, in the same orientation in which the image file was acquired, by utilizing stored orientation information. The processor is also responsive to a user input to print a subset of the image files. The thumbnails are printed with an image number, a date, and a unique identifier of the image file.

28 Claims, 7 Drawing Sheets

READING....

FIG. 6A

XX PHOTOS
FOUND ON CARD

FIG. 6B

ALL PHOTOS
1 COPY    INDEX

USER INTERFACE FOR INSTANT AND FULL-FEATURED INDEX PAGE PRINTING FROM A DIRECT-CONNECT PRINTER

FIELD OF THE INVENTION

This invention relates to printers, and in particular, to a user interface for printing index pages of images.

BACKGROUND OF THE INVENTION

Currently, digital cameras are arranged to be able to download image files to personal computers, for subsequent reproduction by a printer. Images from a digital camera are typically stored on a detachable memory card. The memory card is inserted into an appropriate receptacle that is attached to an external computing device, such as a personal computer or a printer. A facility is typically provided on the computing device or the printer for printing index pages, that is, a page, or pages, of thumbnail representations of all the images stored on the memory card. A thumbnail representation of an image is a reduced version of that image, usually with enough detail to discern the image from others. The facility for printing index pages may include a menu selection on the computing device or a button on the printer. The index pages are useful for reviewing image files on the memory card, and for selecting individual image files to be printed.

When printing an index page, a user is not able to select the images that will be printed. Invoking the index page facility causes all the images on the memory card to be printed. For users with high capacity memory cards this may be disadvantageous, as a large number of images are printed that are not required, wasting time, media, and ink. If multiple events are recorded on the same memory card, a user must print the images for all the events, again wasting time, media, and ink.

Furthermore, in the conventional approach the images on index pages are all printed in landscape orientation without regard for the orientation of the image. When reviewing the index pages, the user must turn his head or the index page to view those images that do not have a landscape orientation.

Each image on the index page is designated by an image number, usually superimposed on a corner in the field of the image. The image number thus obscures the area of the image over which it is superimposed. Also, the image number does not provide an absolute identification of the image. It is simply the number of an image in the memory card, and changes when images are deleted from the memory card. There is no absolute identification of the image, such as a date or filename, to specifically distinguish an image, and which does not change after the image is acquired.

It is an object and advantage of this invention to provide a user with the ability to select a subset of images to be printed when printing an index page. A user is not required to print all images on the memory card when printing an index page. It is a second object and advantage of this invention to provide index pages where the images are printed in the orientation in which they were acquired. That is, images are printed "right side up" so users do not have to turn their heads to view individual images on an index page. It is a further object and advantage of this invention to provide an absolute identifier for each image on the index page that does not change after the image has been acquired. Further, image identifiers are printed outside the field of the image and thus do not obscure the image. It is a further object and advantage of this invention to automatically select the size of the thumbnail image depending on the size of the printing media. For example, when index pages are being printed on A4 paper, a thumbnail is printed in a larger format than when index pages are printed on A6 paper, allowing for a more efficient use of paper.

SUMMARY OF THE INVENTION

A user interface for a printer is disclosed for printing image files. The user interface includes a display for displaying information, including messages to a user, an input device for enabling the user to respond to the displayed messages, an interface to a detachable memory device including at least one image file, and a processor coupled to the input device, display, and to the interface. The processor is responsive to a user input to print a thumbnail of the image file, in the same orientation in which the image file was acquired, by utilizing stored orientation information. The processor is also responsive to a user input to print a subset of the image files. The thumbnails are printed with an image number, a date, and a unique identifier of the image file.

DETAILED DESCRIPTION OF THE INVENTION

Figure 1:
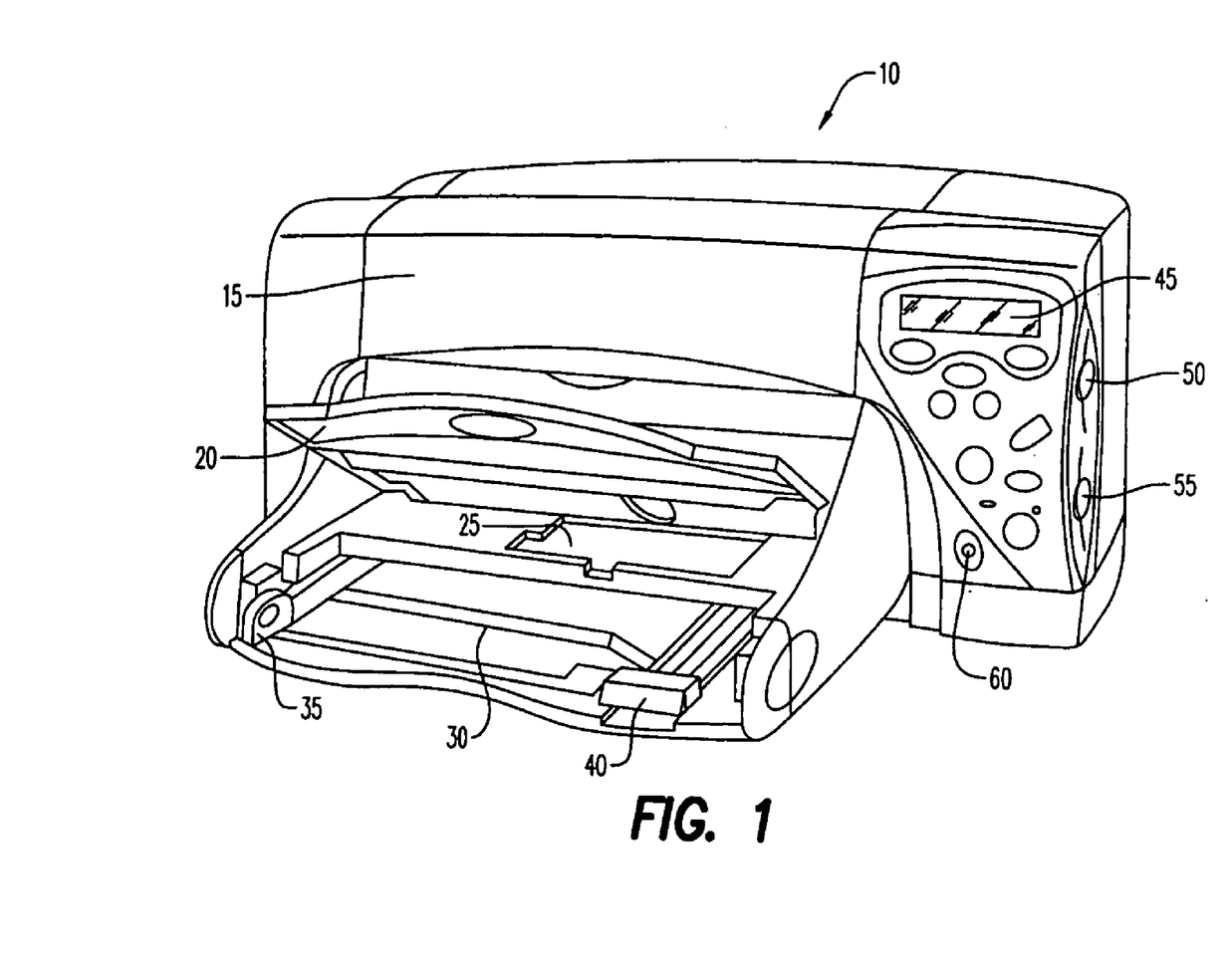
FIG. 1 shows a printer suitable for practicing this invention.

A printer 10 in which this invention is practiced is shown in FIG. 1. Printer 10 includes top cover 15, output tray 20, trays 25, 30 for media to be printed upon, paper guides 35, 40, display 45, memory card slots 50, 55, and power button 60.

Figure 2:
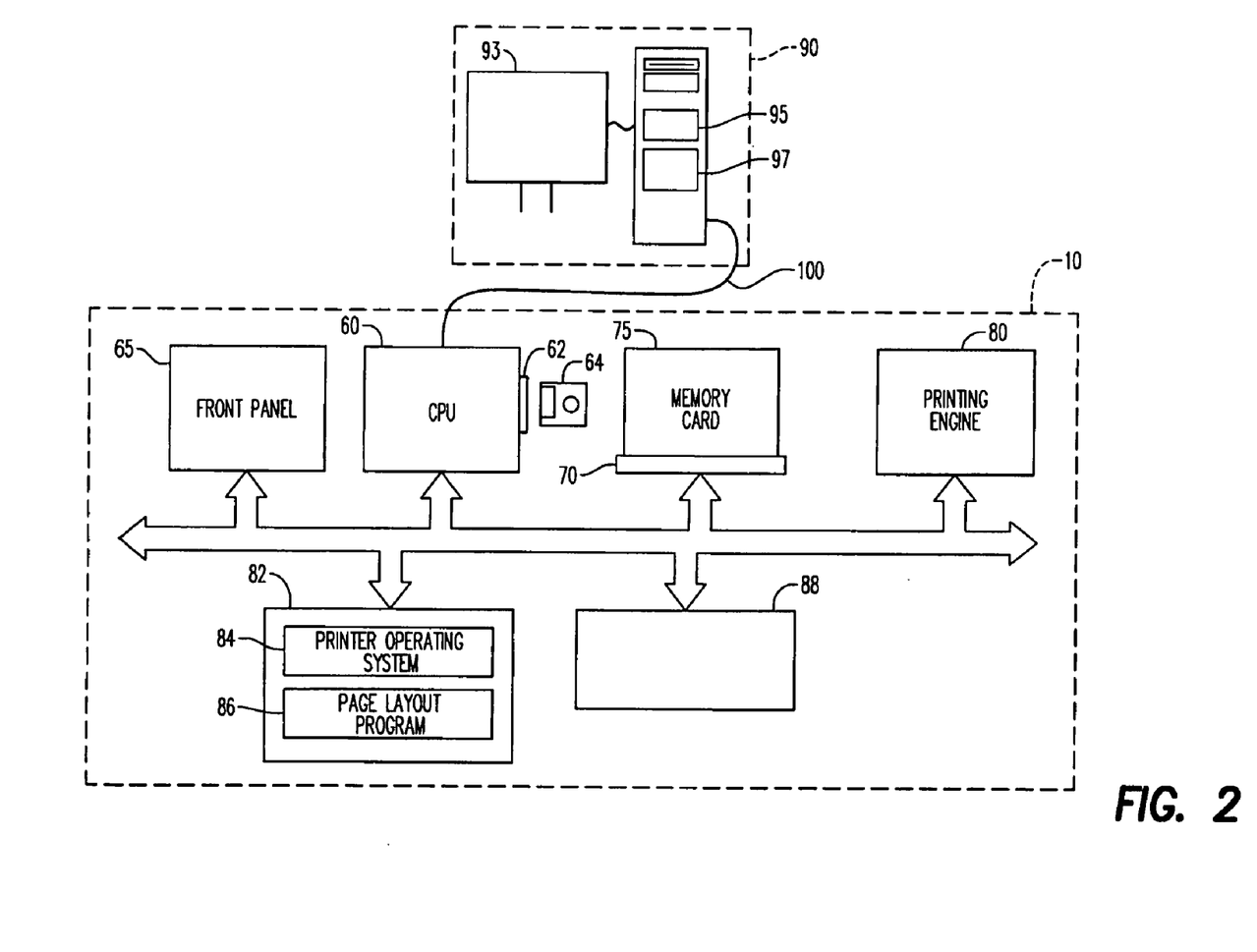
FIG. 2 shows a block diagram of the printer.

FIG. 2 shows a block diagram of printer 10. Printer 10 includes processor 60 for directing printer operations, front panel 65 for receiving user inputs and for displaying messages to a user, receptacle 70 for receiving a memory device, such as a memory card 75 from a digital camera (not shown), and a printing engine 80. Printer 10 also includes read only memory (ROM) 82 for storing programs, including a printer operating system 84 and a page layout program 86 in accordance with the invention. Printer 10 further includes random access memory (RAM) 88 for storing temporary system operating parameters and temporary data for the page layout system.

Printer 10 is optionally connected to an external computing device 90 through link 100. The external computing device 90 may be a personal computer or any device capable of communicating with printer 10, and typically includes display 93, processor 95, and storage 97.

The processor 60 executes the programs in ROM 82 either automatically, in response to user inputs from front panel 65, or in response to inputs from external computing device 90, if it is connected.

Processor 60 preferably includes a facility 62 for receiving and storing additional programs contained on computer storage media, also referred to herein as memory media 64, such as a floppy disk drive, a compact disk drive, or a memory cartridge. Such programs may include, for example, the printer operating system 84, the page layout program 86, programs for controlling print engine 60, programs for operating on, or in response to, various file types, including direct print order format (DPOF) files, jpeg files, or gif files, upgrades for programs already residing in read only memory (ROM) 82, and in general, programs related to printing operations and for printing images.

Figure 3:
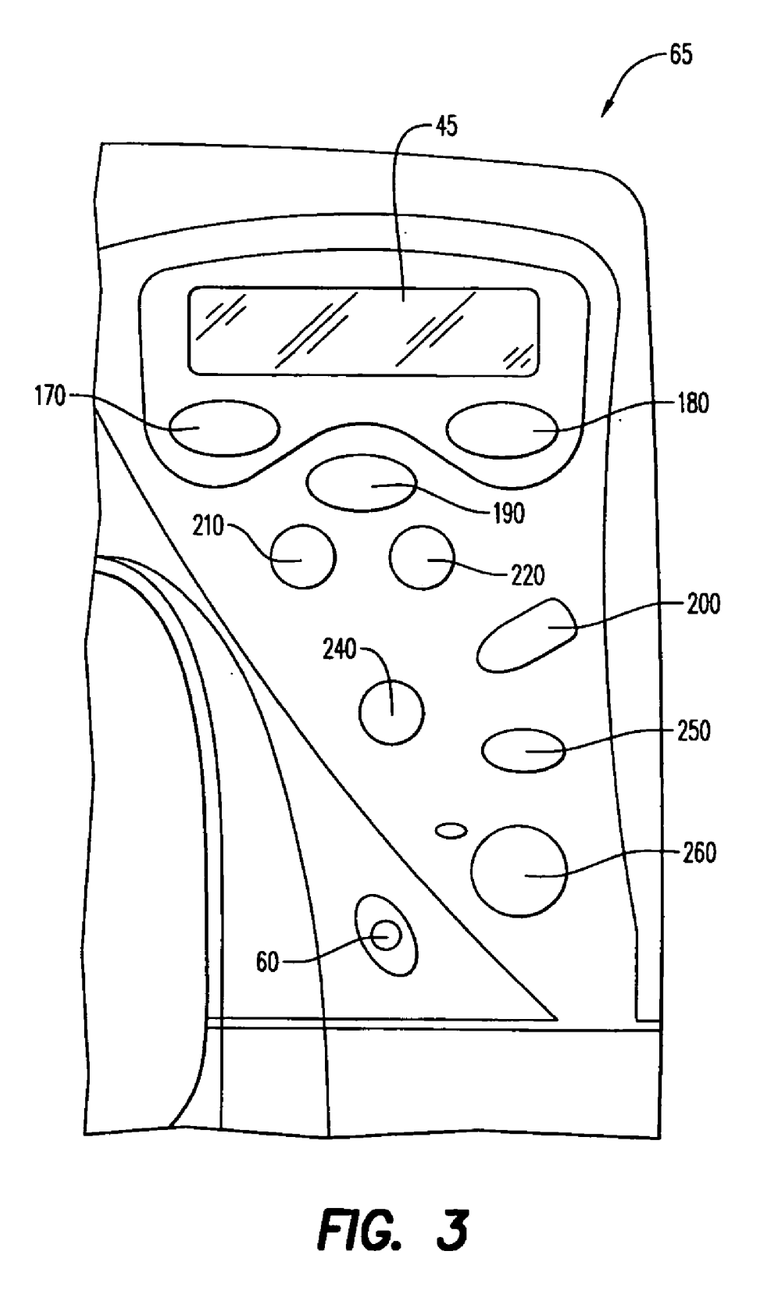
FIG. 3 is a diagram of a front panel portion of the printer, the front panel providing a user interface.

Front panel 65 is shown in greater detail in FIG. 3. Front panel 65 includes display 45 for preferably providing messages, prompts, information as to the content of memory card 75, information regarding the operation of printer 10, and other information to the user. Display 45 is preferably a 2-line, 16 characters per line, liquid crystal display. Front panel 65 further includes power button 60 for turning the printer on and off, button 170 for selecting a number of copies to be printed, button 180 for selecting a printed size of an image file, button 190 for selecting image files to be printed, and button 200 to cause the printer to print the selected image files. Front panel 65 further provides button 210 to stop printing, cancel a selection presented on display 45, or to answer no to a question presented on display 45. Button 220 is also provided to make a selection presented on display 45, or to answer yes to a question presented on display 45. Button 240 is provided for saving selected image files to external computing device 90, if it is connected, and button 250 is for changing the printer settings. The printer settings that may be changed by operating button 250 include the page layout settings, which will be explained in greater detail below.

Figure 4A:
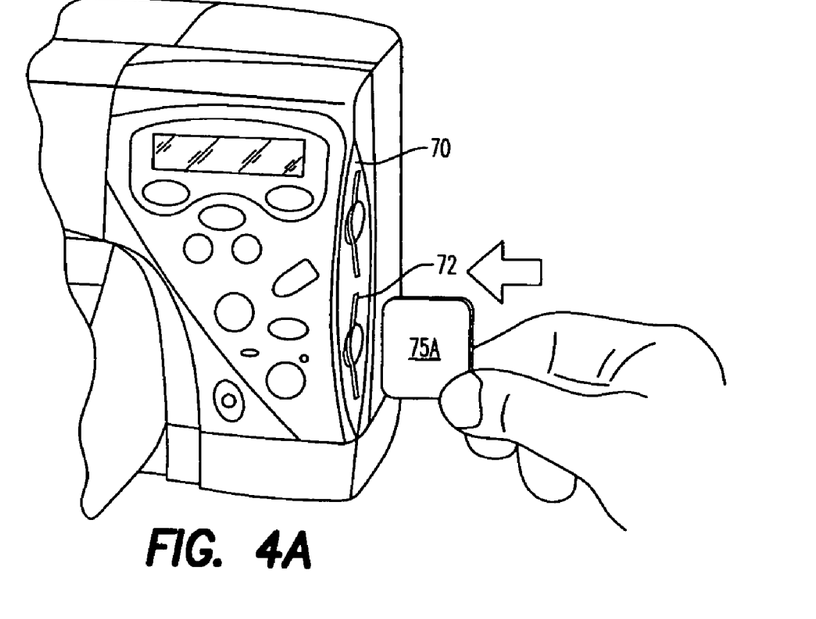
FIGS. 4A and 4B show a partial view of the printer and an apparatus for accepting memory cards.
Figure 4B:
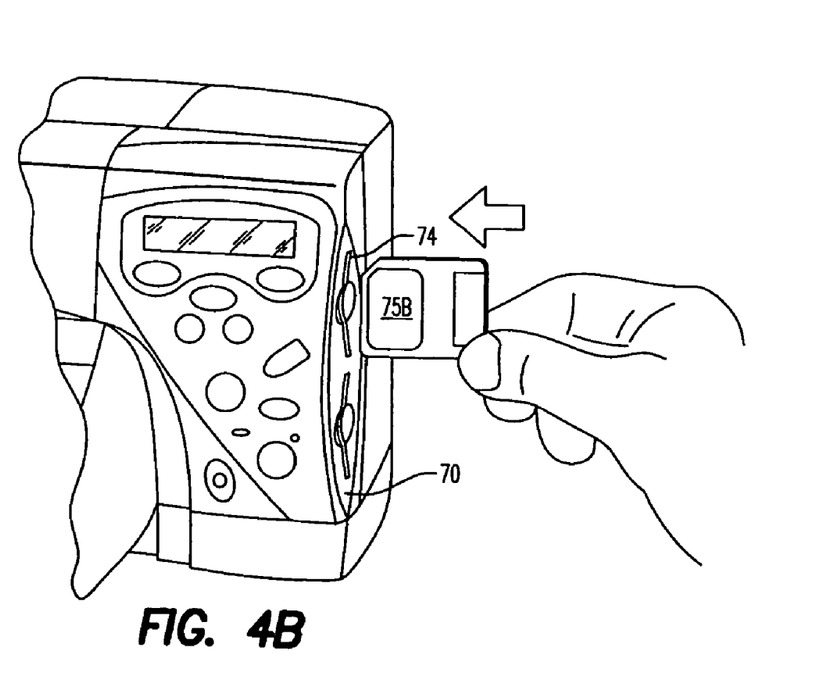

FIGS. 4A and 4B show a partial view of printer 10. Memory cards 75A and 75B are of the type used in digital cameras for storing image files. Receptacle 70 preferably includes at least one connector 72 for receiving the memory card 75A, which may be one known as a CompactFlash™ memory card, and at least one connector 74 for receiving a memory card 75B, which may be one known as a SmartMedia™ memory card.

Figure 5:
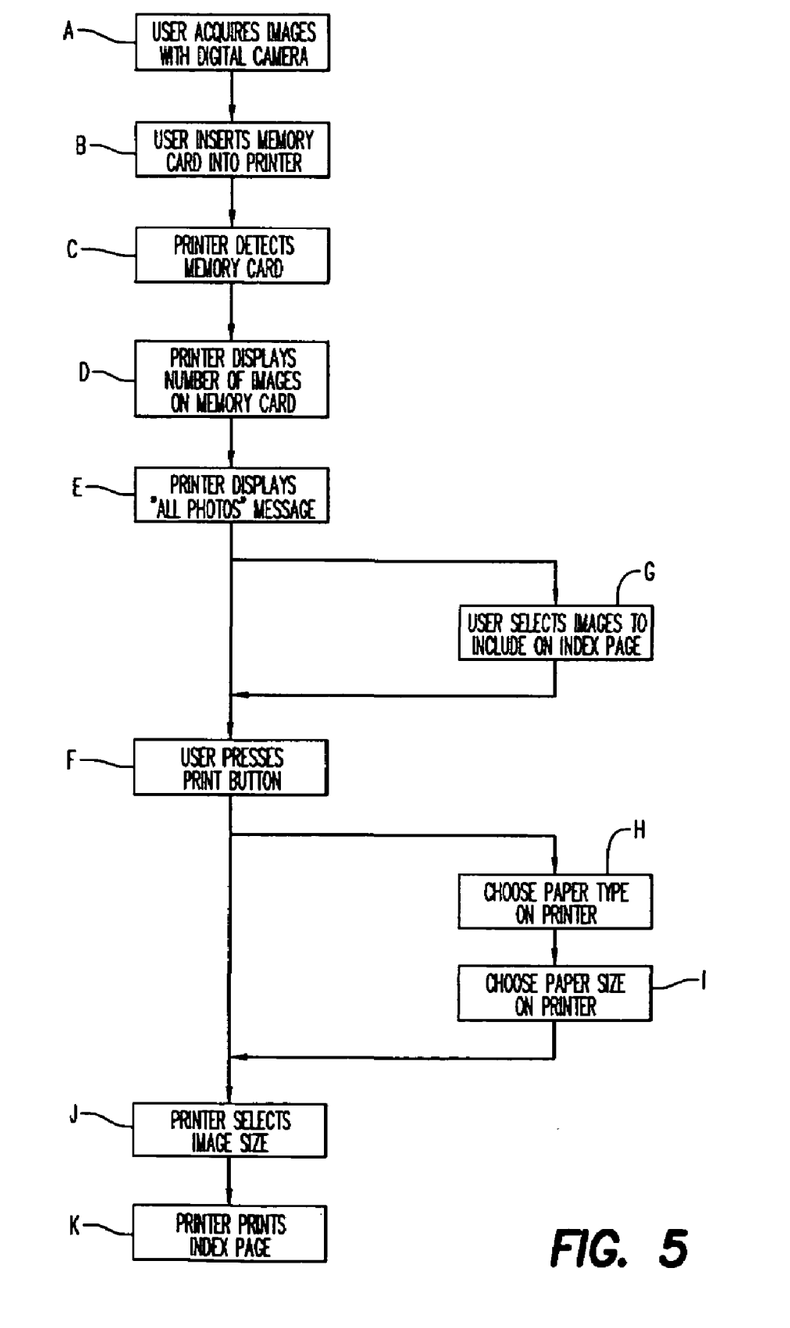
FIG. 5 is a flow chart of operations performed for printing index pages.

Turning now to FIGS. 5 and 6, in accordance with the invention, in step A a user begins by taking photographs or recording images. This is preferably done with a digital camera, but it is important to note that the images may be generated by any means that produces an appropriate image file format on a suitable memory device, such as a memory card 75. Images are stored in memory card 75 in a digital file format, for example, a jpeg type file. Memory card 75 further includes a date, and orientation information about each image.

Figure 6A:
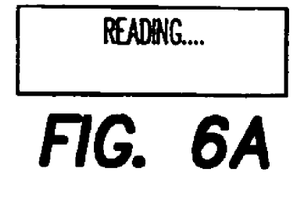
FIGS. 6A, 6B, 6C, and 6D show examples of messages displayed on a display of the printer.
Figure 6B:
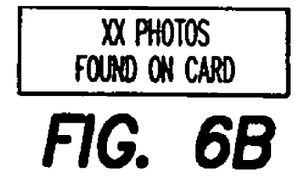
Figure 6C:
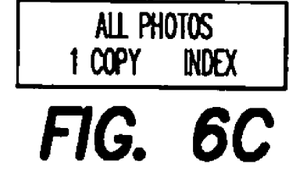

The user then removes memory card 75 from the digital camera and inserts it into receptacle 70 of printer 10 as in step B. When printer 10 is idle, display 45 preferably shows three fields: quantity of images chosen (top line), number of copies (bottom left), and image size (bottom right) as shown in FIG. 6C. Upon insertion of memory card 75 into receptacle 70, the printer operating system detects the memory card 75 (step C) and display 45 preferably shows the word "Reading . . . ", as shown in FIG. 6A. Upon completion of the read step, display 45 shows the number of image files found on the memory card 75 (step D) as shown in FIG. 6B. Then display 45 displays "ALL PHOTOS, 1 copy, Index" as shown in step E of FIG. 5 and in FIG. 6C.

Figure 6D:
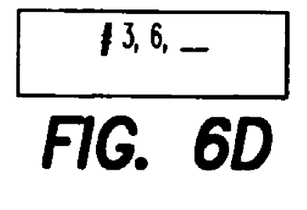

At this point a user may operate button 200 to print all the images on memory card 75 on index pages as in step F. Alternatively, as shown in step G of FIG. 5, the user may operate the front panel button 190 to select which image files to print. This is preferably done by operating button 190 to cause display 45 to display the number corresponding to the desired image as shown in FIG. 6D. When the number of the desired image is displayed, a user operates button 220 to select the image. This process is repeated until all of the desired images have been selected. A user may also select a range of images to be printed. To select a range, the user operates button 190 until the number of the first image of the range is displayed. The user operates button 220 until a dash appears in display 45. The user then operates button 190 to select the last image of the range, and then operates button 220 to add the number of the last image to the range of images to be selected. For all selections of images, the order in which the user selects the image files is the order in which they will be printed.

As stated above, in step F the user then operates button 200 on front panel 65 to cause the printer to print the index pages.

After operating button 200 to print the index pages, the user may optionally select a paper type (step H) and a paper size (step I). The printer then selects the size of the thumbnails from the paper size as in step J, and prints the thumbnails (step K).

The resulting index pages comprise a thumbnail of each image file selected by the user from memory card 75. The images are printed in the orientation in which they were originally acquired, that is, they are always printed "right side up" regardless of whether they are formatted in a landscape or portrait orientation. The orientation of the image is preferably determined by the source of the image file.

The source of the image, for example, a digital camera, may have a sensor which detects the orientation of an image as it is being acquired and inserts the information in the image file. Some image sources allow the user to rotate the image to a particular orientation and then save the orientation information as part of the image file. It is also contemplated that the image source may store the image orientation information separately on the memory card 75.

To determine the orientation of each image, the printer 10 queries the image file, or the orientation information, as appropriate, on the memory card 75. In the event that the memory card 75 does not include orientation information, the printer 10 defaults to a landscape orientation for that image file.

Included with each thumbnail is an image number, which may change as files are deleted from the memory card 75, and a unique identifier. The unique identifier is preferably the filename that is assigned to the image file by the digital camera in the memory card 75, and does not change, thus providing an absolute identifier for the image. The date the image file was acquired is also included with the thumbnail. The image number, filename, and date are printed outside the field of the thumbnail image and, as such, do not obscure the image, allowing a user to view the entire thumbnail.

The size of the printed thumbnails is automatically determined from the paper size. For A/A4 paper, the length of the thumbnail image is about 1.5 inches. For 4×6 inch, Hagaki, and A6 paper, the length of the thumbnail image is about 1.1 inches. This allows about 25 thumbnails to be printed on A/A4 paper and about 9 images to be printed on 4×6 inch, Hagaki, and A6 paper. The other dimension of the image is determined by the image aspect ratio. The index images are not cropped by the printer 10.

Figure 7:
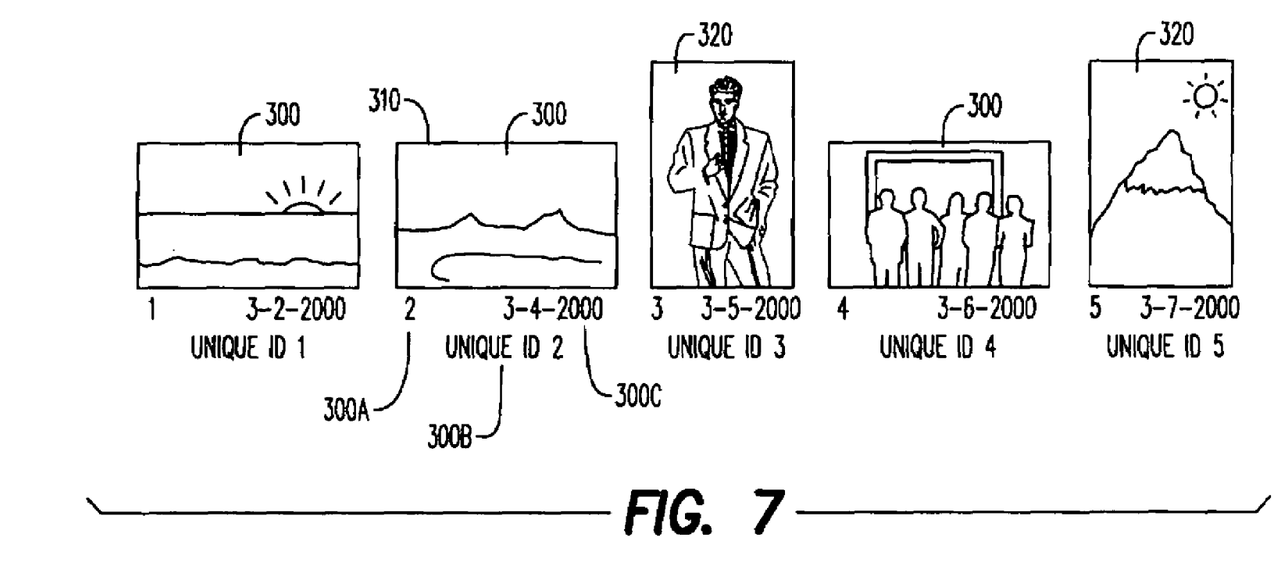
FIG. 7 shows a schematic representation of a set of thumbnails printed by utilizing the disclosed user interface.

FIG. 7 shows a schematic example of a set of thumbnails that have been printed by utilizing the user interface. Both the thumbnails having a landscape orientation 300 and the thumbnails having a portrait orientation 320 are printed "right side up" so users do not have to turn their heads to view the individual thumbnails. Each thumbnail has an image number 300A, a unique identifier 300B, and a date 300C, which are printed outside the border 310 of the thumbnails 300, 320.

It is important to note that while the user interface has been described in the context of a printer, it may be embodied in any suitable device, connected directly or indirectly to the printer 10. For example, the printer user interface may be embodied in the external computing device 90, the display 93 and an appropriate input device. The user interface may also be included in an external computer, or a suitably equipped internet appliance connected to printer 10 through the internet or another wired or wireless network.

While the invention has been particularly shown and described with respect to preferred embodiments thereof, it will be understood by those skilled in the art that changes in form and details may be made therein without departing from its scope and spirit.

What is claimed is:

1. A printer user interface comprising:
   a display for displaying information, including messages to a user;
   an input device for enabling the user to respond to the displayed messages;
   an interface to a detachable memory device including a plurality of image files; and
   a processor coupled to said input device, said display, and to said interface, said processor responsive to a user input to print an index page of thumbnails of said plurality of image files in the same orientation in which each said image file was acquired by utilizing stored orientation information.

2. The user interface of claim 1, wherein said processor is further responsive to a user input to print an index page of thumbnails of a selected subset of said plurality of image files.

3. The user interface of claim 1, wherein said processor is further responsive to a user input specifying a number of thumbnails to be printed for an image file.

4. The user interface of claim 1, wherein each said image file is assigned a unique identification in said detachable memory device, and wherein each thumbnail is printed with said unique identification.

5. The user interface of claim 4, wherein each image file is assigned an image number and a date in said detachable memory device, and each thumbnail is printed with said image number and date.

6. The user interface of claim 5, wherein said unique identification, said image number, and said date are printed outside of a border of said thumbnail.

7. The user interface of claim 1, wherein a printed size of each said thumbnail is determined by a size of a sheet on which said thumbnail is to be printed.

8. A printer comprising:
   a user interface further comprising:
   a display for displaying information, including messages to a user;
   an input device for enabling the user to respond to the displayed messages;
   an interface to a detachable memory device including at least one image file; and
   a processor coupled to said input device, said display, and to said interface, said processor responsive to a user input to print an index page of thumbnails of said plurality of image files in the same orientation in which each said image file was acquired by utilizing stored orientation information.

9. The printer of claim 8, wherein said processor is further responsive to a user input to print an index page of thumbnails of a selected subset of said plurality of image files.

10. The printer of claim 8, wherein said processor is further responsive to a user input specifying a number of thumbnails to be printed for an image file.

11. The printer of claim 8, wherein each image file is assigned a unique identification in said detachable memory device, and wherein each thumbnail is printed with said unique identification.

12. The printer of claim 11, wherein each image file is assigned an image number and a date in said detachable memory device, and each thumbnail is printed with said image number and date.

13. The printer of claim 12, wherein said unique identification, said image number, and said date are printed outside of a border of said thumbnail.

14. The printer of claim 8, wherein a printed size of each thumbnail is determined by a size of a sheet on which said thumbnail is to be printed.

15. A method of printing images at a printer comprising the steps of:
   acquiring a plurality of image files in a digital file format from a detachable memory device; and
   printing an index page of thumbnails of said plurality of image files in the same orientation in which each image file was acquired by utilizing stored orientation information.

16. The method of claim 15, said method further comprising the step of printing an index page of thumbnails of a selected subset of said plurality of image files.

17. The method of claim 15, further comprising printing a specified number of thumbnails for an image file.

18. The method of claim 15, wherein each said image file is assigned a unique identification, said method further comprising the step of printing each thumbnail with said unique identification.

19. The method of claim 18, wherein each image file is assigned an image number and a date, said method further comprising the step of printing each thumbnail with said image number and date.

20. The method of claim 19, further comprising the step of printing said filename, said image number, and said date outside of a border of said thumbnail.

21. The method of claim 15, further comprising the step of determining a printed size of each thumbnail from a size of a sheet on which said thumbnail is to be printed.

22. A computer readable memory media, including instructions for controlling a user interface at a printer comprising a display for displaying information, including messages to a user, an input device for enabling the user to respond to the displayed messages, an interface to a detachable memory device including at least one image file, a processor coupled to said input device, said display, and to said interface, said memory media comprising:
   means for controlling said processor to print an index page of thumbnails of said plurality of image files in the same orientation in which each image file was acquired by utilizing stored orientation information.

23. The memory media of claim 22, said memory media further comprises means for controlling said processor to print an index page of thumbnails of a selected subset of said plurality of image files.

24. The memory media of claim 22, further comprising means for controlling said processor to print a specified number of thumbnails for an image file.

25. The memory media of claim 22, wherein each image file is assigned a unique identification, said memory media further comprising means for controlling said processor to print each thumbnail with said unique identification.

26. The memory media of claim 25, wherein each image file is assigned an image number and a date, said memory media further comprising means for controlling said processor to print each thumbnail with said image number and date.

27. The memory media of claim 26, further comprising means for controlling said processor to print said filename, image number, and date outside a border of said thumbnail.

28. The memory media of claim 22, further comprising means for controlling said processor to determine a printed size of each thumbnail from a size of a sheet on which said thumbnail is to be printed.

* * * * *

UNITED STATES PATENT AND TRADEMARK OFFICE
CERTIFICATE OF CORRECTION

| | | |
|---|---|---|
| PATENT NO. | : 7,139,095 B1 | Page 1 of 1 |
| APPLICATION NO. | : 09/672415 | |
| DATED | : November 21, 2006 | |
| INVENTOR(S) | : Wendy F. Hunter | |

It is certified that error appears in the above-identified patent and that said Letters Patent is hereby corrected as shown below:

In column 5, line 48, in Claim 4, after "each" delete "said".

In column 5, line 60, in Claim 7, after "each" delete "said".

In column 6, line 42, in Claim 18, after "each" delete "said".

Signed and Sealed this

Ninth Day of December, 2008

JON W. DUDAS
*Director of the United States Patent and Trademark Office*